United States Patent Office
3,684,435
Patented Aug. 15, 1972

3,684,435
METHOD OF PREPARING CALCIUM FLUORIDE AND SOLUBLE PHOSPHATE FROM FLUORINE CONTAINING PHOSPHATE ROCK
Lauri A. Lepomaa, Kotka, and Timo O. Roisko, Kokkola, Finland, assignors to Rikkihappo Oy, Helsinki, Finland
No Drawing. Filed May 7, 1970, Ser. No. 35,588
Claims priority, application Finland, May 20, 1969, 1,494/69
Int. Cl. C01f 11/12; C01b 25/32
U.S. Cl. 423—163
3 Claims

ABSTRACT OF THE DISCLOSURE

The invention relates to an improved method for producing and obtaining calcium fluoride from a reaction of a phosphate rock such as apatite with a water-soluble fluoride in aqueous solution such as aqueous ammonium fluoride, the improvement being the employment of an acid such as phosphoric acid or sulfuric acid in an amount to lower pH to about 6.5 or lower but maintaining the pH within a range in which the calcium fluoride formed by the reaction remains undissolved, i.e. remains substantially insoluble, the ammonium fluoride being employed in the reaction preferably in an excessive amount in order to increase the reaction degree.

SUMMARY OF THE INVENTION

The present invention relates to a method of preparing calcium fluoride suitable for use as raw material of hydrogen fluoride, and at the same time, soluble phosphate, by decomposition of phosphate rock by means of an acid and a soluble fluoride, which can be prepared by known prior art methods, from waste fluorine derived from the phospor fertilizer and phosphoric acid industries.

Phosphate rock usually contains from about three to about three and a half percent of fluorine. This fluorine evaporates at the phosphoric acid and fertilizer plants, predominantly in the form of silico tetrafluoride ($SiF_4$) which in practice is recovered with water as silico hydrotetra fluoric acid, i.e. fluorosilicic acid ($H_2SiF_6$). Much investigatory work has been carried out in view of refining these compounds to products of as high a value as possible, such as hydrogen fluoride, and methods have been developed such as for instance those disclosed in the U.S. Pats. 2,819,151 and 3,257,167. The prior known methods present many difficulties, or they are economically unsatisfactory, and have therefore not gained widespread application. On the other hand hydrogen fluoride is at present commercially prepared almost exclusively from quarried and concentrated calcium fluoride ($CaF_2$).

Attempt has been made to use the above mentioned waste fluorine in the preparation of $CaF_2$, as disclosed in the U.S. Pats. 2,780,521 and 2,780,523. The $SiO_2$-content of the product however is too high and the separating of it is very difficult.

Ammonization of the waste fluorine represents a means to separate the silicon from the fluorine, which otherwise is very difficult to carry out. The reaction $$H_2SiF_6 + 6NH_3 + 2H_2O \rightarrow 6NH_4F + SiO_2$$

proceeds rapidly in solution phase, producing an ammonium fluoride solution from which the insoluble silica ($SiO_2$) can be separated, ref. (the) U.S. Pats. 2,728,634 and 3,271,107. Water and ammonia can be vaporized from the solution, which yields ammonium bifluoride utilizable for the preparation inter alia of hydrogen fluoride, for instance according to the publication Khim. Prom. 7 (1961), 450–52, I. M. Boguslavskij et al. This method is almost inpracticable, among other things because of corrosion.

The ammonium fluoride solution can also be utilized for the preparation of calcium fluoride by addition to the $NH_4F$-solution of a calcium mineral such as calcite, gypsum (I. M. Boguslavskij et al. Issled. Khim. Teknol, Udogr. Pestist. Dolei. AN SSR Otd. Biokhim. Biofiz. Khimfiz. Akk. Soedin. (1966), 231–45), or apatite as described in an article by M. E. Pozin et al. in Khim. Prom. 45 (1969) 196–197.

The reaction with calcium carbonate is rapid and proceeds almost to completion, but the raw material cost, and the recirculation of the ammonia to the process make the process economically unprofitable. The reactions of gypsum and apatite with the ammonium fluoride solution are slow and incomplete. Furthermore it is necessary to use a comparatively high temperature, to remove the excess ammonia at a reduced pressure, and to add an excess of fluorine to the mixture.

The method according to the present invention eliminates the above mentioned drawbacks and makes possible the preparation of a calcium fluoride suitable for the preparation of hydrogen fluoride, as well as that of a soluble phosphate. The characteristics of the method appear from the accompanying claims. According to this method the phosphate rock is decomposed by means of the obtained water-soluble fluoride and a mineral acid, the pH of the solution being maintained at 6.5 or below, however high enough to prevent the dissolution of the $CaF_2$ formed.

The method according to the invention does not require reduced pressure since the gases potentially liberated during the process are absorbed in the acids used as dissolving aids. Further advantages are a low temperature, ranging between 40 and 90° C., and a relatively high concentration of the phosphate solution, ranging between 25–35 perecnt of $P_2O_5$, which makes the subsequent potential evaporation step economic.

The calcium fluoride precipitated during the process is, after separation and washing, immediately suitable for use in the preparation of hydrogen fluoride.

As the soluble fluoride in the method according to the invention, ammonium fluoride and/or a mixture of ammonium fluoride and ammonium bifluoride, prepared by refining methods per se known, from the fluorine of phosphate rock, or the corresponding alkali fluorides, can be utilized. The dissolving aids consist of phosphoric acid, and in addition e.g. sulphuric acid. By the effect of the acid, the pH of the reaction solution can be maintained below 6.5 which is advantageous from the point of view of dissolution.

Besides the phosphoric and sulphuric acids the acid may consist of any mineral or organic acid. Maintaining the pH of the reaction mixture below 6.5 results, in addition to a more rapid dissolution, to the advantage that the degree of reaction of the apatite is high. A further advantage derived from the use of acid is that no excess of fluoride is necessary, the reaction proceeding to completion with stoichiometric proportions of the starting materials with respect of $CaF_2$. The reaction degree is in practice somewhat higher if a little excess of fluoride is used.

In case excess fluoride is used, it is possible to precipitate the unreacted fluorine as calcium fluoride with a highly soluble calcium salt.

A general advantage provided by the method is, that the fluorine of the phosphate rock is prevented from polluting the atmosphere, the method thus making possible the decomposition of phosphate rock into desirable products of which the silicon free calcium fluoride is an economically desirable raw material for hydrogen fluoride production. In case the fluorine of the phosphate rock is recovered as ammonium fluoride and then utilized in the method according to the invention, a concentrated ammonium phosphate solution obtained.

The following examples illustrate the method according to the invention without however restricting the same in any way.

EXAMPLE 1

To 335 g. of a fluoride solution containing 20% by weight, of ammonium fluoride and 15% by weight of ammonium bifluoride, 230 g. 76% phosphoric acid were added. The solution was heated to 70° C. and mixed with 200 g. of concentrated, finely divided Kola Peninsula apatite having a Ca-content of 37% and a $SiO_2$-content of 2%. The precipitate formed after one hour of stirring was separated from the solution on a suction filter, and washed with water. The analyses of the solution and the precipitate were as follows:

Precipitate: Weight 140 g. F, 32.9%; $P_2O_5$, 5.0%; $SiO_2$, 0.8%. Solution: F, 1.9%; $P_2O_5$, 34.8%; $NH_3$, 8.5%; Molar ratio N/P, 0.98.

EXAMPLE 2

A series of three reaction vessels of polypropene the volume of each being 2.5 liters was charged continuously with 250 g. of the mentioned Kola Peninsula apatite, 552 ml. of 34% $NH_4F$ solution, which was obtained by ammonizing the residue fluorine and 312 ml. of 45% $P_2O_5$ wet-process phosphoric acid, and 390 ml. water.

The reaction product of calcium fluoride was dried in 200° C. and contained then 3.0% by weight in water insoluble $P_2O_5$ and 0.8 $SiO_2$. The temperatures in the reactors were: I reactor 50–60° C., II reactor 60–70° C. and III reactor 65–85° C.

EXAMPLE 3

500 g. of Algeric (Annaba) phosphate, 1000 ml. of 33% $NH_4F$-solution (compare the aforementioned examples), 300 ml. of 30% technical $NH_4HF_2$-solution, and 720 ml. of 62% $H_3PO_4$ wet-process phosphoric acid were stirred 5 hours in a temperature of 65° C. The product CaF contained 3.4% in water insoluble $P_2O_5$, 1.8% Al and 0.9% Fe and about 90% $CaF_2$.

EXAMPLE 4

A mixture of 167 g. of apatite, 333 ml. of 32% ammonium fluoride solution 100 ml. of 30% $NH_4$-bifluoride solution, and 137 ml. of 62% $H_2SO_4$ solution was stirred for 5 hours. The precipitation (137 g.) was washed and dried and contained 1.59% $P_2O_5$, 0.35% Fe, 0.31% Al, and 44.2% F.

EXAMPLE 5

A mixture of 500 g. of Kola Peninsula apatite and a solution containing 1000 ml. of 33% $NH_4F$-solution (sp.w. 1.09 g./cm.$^3$), 300 ml. of 30% $NH_4HF_2$-solution, and 720 ml. of 62% $H_3PO_4$ solution was reacted 5 hours, whereafter the solution was left to precipitate for 15 minutes and decanted, and thereafter reacted 2–5 hours with a new amount of 500 g. apatite. The precipitation was reacted with fresh, for instance in the beginning mentioned solution of fluoride-phosphoric acid solution for 2–5 hours. The apatite was separated by filtration from the residue solution, which may be used for the processing of ammonium phosphate. Also the calcium fluoride was separated from the fresh fluoridephosphoric acid solution and the solution was used for the reaction with the apatite. The residue fluorine in the ammonium phosphate solution, at about 2%, may be precipitated for instance with lime or a Na-salt.

The content of $P_2O_5$ insoluble in water of the produced calcium fluoride is brought to the level of 1.6% $P_2O_5$. It is not necessary to increase the temperature over 65° C. The analysis of the produced calcium fluoride was as follows:

$P_2O_5$ ------------------------------------------- 1.6
Ca ---------------------------------------------- 46.5
F ----------------------------------------------- 45.8
Fe ---------------------------------------------- 1.2
Al ---------------------------------------------- 1.4
$SiO_2$ -------------------------------------------- 0.8
K ----------------------------------------------- 0.17

EXAMPLE 6

Composition: 500 g. apatite, 1150 ml. 32% $NH_4F$-solution, and 510 ml. 85% $HNO_3$ solution. The mixture was stirred as in the aforementioned example. The calcium fluoride was washed and dried and it contained 0.93% $P_2O_5$, 0.31% Fe and 0.32% Al.

We claim:
1. A process for producing $CaF_2$ and water soluble orthophosphate comprising:
 (a) preparing a mixture of:
  (1) water;
  (2) a water soluble fluoride selected from the group consisting of ammonium fluoride, ammonium bifluoride, potassium fluoride, potassium bifluoride, and mixtures thereof;
  (3) a calcium orthophosphate containing mineral comprising apatite; and
  (4) an acid selected from the group consisting of phosphoric acid, sulfuric acid, nitric acid, and mixtures thereof;
 the proportions of the mineral and acid being approximately stoichiometric based on $CaF_2$ and the water soluble fluoride being present in excess such that the pH of the mixture is below 6.5 but above a value at which the $CaF_2$ to be formed would dissolve;
 (b) heating the mixture to a temperature of 40 to 90° C. until a precipitate is formed, the precipitate comprising $CaF_2$ and the supernatant solution containing water soluble orthophosphate;
 (c) reacting the water soluble fluoride in the supernatant solution with an additional quantity of said mineral to form additional $CaF_2$ precipitate; and
 (d) contacting the $CaF_2$ precipitate with an additional quantity of acidified aqueous water soluble fluoride solution having a pH below 6.5 but above a value at which the $CaF_2$ precipitate would dissolve thereby to react any residue of unreacted orthophosphate in the mineral.
2. A process for producing $CaF_2$ and water soluble orthophosphate comprising:
 (a) preparing a mixture of:
  (1) water;
  (2) a water soluble fluoride;
  (3) a calcium orthophosphate containing mineral comprising apatite; and
  (4) an acid;
 the proportions of the mineral and acid being approximately stoichiometric, based on $CaF_2$ and the water-soluble fluoride being present in excess such that the pH of the mixture is below 6.5 but above a value at which $CaF_2$ to be formed would dissolve;
 (b) heating the mixture to a temperature of 40 to 90° until a precipitate is formed, the precipitate com- prising $CaF_2$ and the supernatant solution containing water soluble orthophosphate; and (c) adding additional mineral to the supernatant solution whereby additional $CaF_2$ precipitate and water soluble orthophosphate are formed.

3. A process according to claim 1, in which the solution is agitated during the heating and the heating is to a temperature of 50 to 85° C. and for a period of one-half hour to five hours.

References Cited

UNITED STATES PATENTS

| | | | |
|---|---|---|---|
| 2,013,970 | 9/1935 | Moore | 23—109 X |
| 3,407,035 | 10/1968 | Yu Shen | 23—109 |
| 3,494,735 | 2/1970 | Cochran | 23—109 X |
| 3,362,785 | 1/1968 | Lehr | 23—88 |
| 3,323,864 | 6/1967 | Lapple | 23—88 X |
| 2,780,522 | 2/1957 | Gloss et al. | 23—88 |
| 2,780,524 | 2/1957 | Gloss et al. | 23—88 |

OTHER REFERENCES

McPherson & Henderson book "A Course in General Chemistry," third ed., 1927, pp. 389 and 390. Ginn & Co., N.Y.

EDWARD STERN, Primary Examiner

U.S. Cl. X.R.

423—167, 311, 497